(12) United States Patent
Lassota

(10) Patent No.: US 10,334,982 B1
(45) Date of Patent: Jul. 2, 2019

(54) BEVERAGE BREWER FOR VARIABLE SIZED DISPENSERS

(71) Applicant: Michael W. Lassota, Wauconda, IL (US)

(72) Inventor: Michael W. Lassota, Wauconda, IL (US)

(73) Assignee: FOOD EQUIPMENT TECHNOLOGIES COMPANY, INC., Lake Zurich, IL (US)

( * ) Notice: Subject to any disclaimer, the term of this patent is extended or adjusted under 35 U.S.C. 154(b) by 1570 days.

(21) Appl. No.: 13/845,013

(22) Filed: Mar. 17, 2013

Related U.S. Application Data

(60) Provisional application No. 61/614,046, filed on Mar. 22, 2012.

(51) Int. Cl.
*A47J 31/44* (2006.01)

(52) U.S. Cl.
CPC .................. *A47J 31/4403* (2013.01)

(58) Field of Classification Search
CPC ........ A47J 31/467; A47J 31/405; A47J 31/02; A47J 31/06
USPC ........................... 99/280, 283, 285, 300, 323
See application file for complete search history.

(56) References Cited

U.S. PATENT DOCUMENTS

| | | | | |
|---|---|---|---|---|
| 4,858,523 A * | 8/1989 | Helbling | ............... | A47J 31/007 99/280 |
| 5,490,447 A * | 2/1996 | Giuliano | ............. | A47J 31/3614 99/286 |
| 6,571,685 B1 * | 6/2003 | Lassota | ................. | A47J 31/002 99/283 |
| 2013/0199377 A1 * | 8/2013 | Jirnsum | .............. | A47J 27/2105 99/282 |

* cited by examiner

*Primary Examiner* — Ibrahime A Abraham
*Assistant Examiner* — Justin C Dodson
(74) *Attorney, Agent, or Firm* — James W. Potthast; Potthast & Associates

(57) ABSTRACT

Beverage brewer (10) with a control system (FIGS. 5, 6) has a brew basket (22) with a central axis (38), a bottom with an offset drain hole (41) radially, outwardly spaced from the central axis (38) for passing the hot beverage or beverage concentrate to a container (34, 36) and a position detectable element(52). A circular collar (24) mounts the brew basket (22) to the housing (12, 18) in at least two different angular positions (FIG. 3) in which the drain hole (41) is respectively located in at least two different positions outwardly spaced from the central axis (38) to pass brewed beverage to the container (34, 36) when in two different positions (FIG. 1). A sensor (56) detects the angular positions of the brew basket (22, and a controller (66, FIG. 6) responds to the sensor (56) to enable only preselected functions of associated with the sensed angular position.

8 Claims, 3 Drawing Sheets

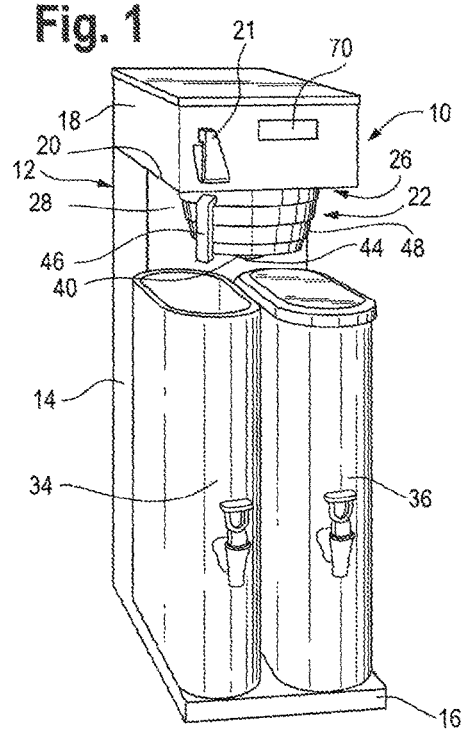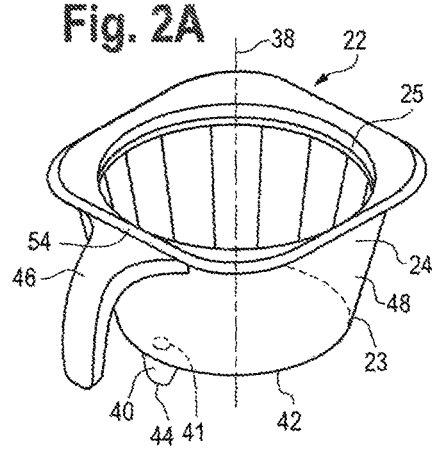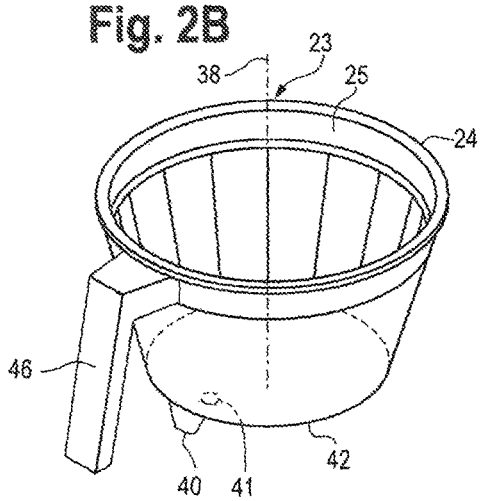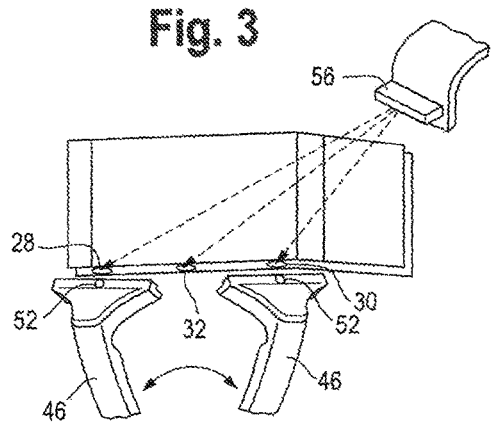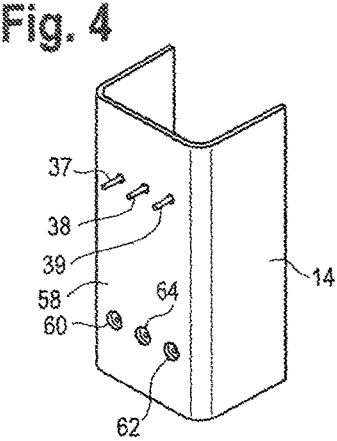

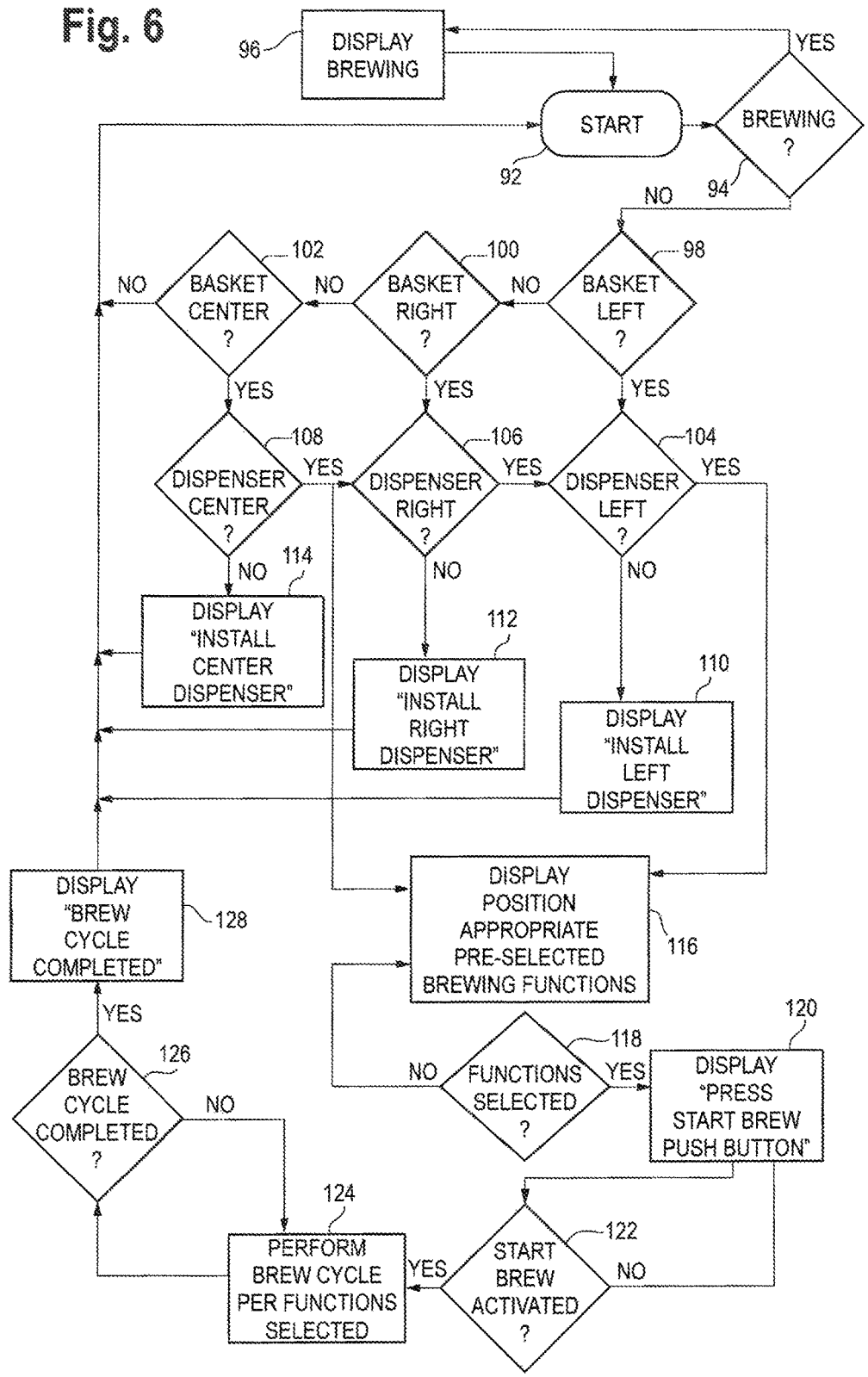

BEVERAGE BREWER FOR VARIABLE SIZED DISPENSERS

CROSS-REFERENCE TO RELATED APPLICATION

This application claims the benefit under 35 U.S.C. 119(e) of provisional patent application No. 61/614,046, filed Mar. 22, 2012, and entitled "Beverage Brewer for Variable Sized Dispensers", which is hereby incorporated by reference.

BACKGROUND OF THE INVENTION

Field of the Invention

This invention relates generally to commercial, electrical, drip-type beverage brewers, and more particularly, to such brewers with two or more dispenser filling stations.

Discussion of the Prior Art

Commercial, electrical, drip-type beverage brewers which produce one half gallon to three gallons of freshly brewed beverage per brew cycle are well known. In the case electrical tea brewers, a single container, such as an insulated dispenser with a beverage dispense faucet, a freshly brewed tea extract is brewed with hot water into the container which is mixed with unheated diluent water that is also added to the same container to produce a freshly brewed but cool tea beverage. Examples of such brewers are shown in U.S. Pat. No. 6,571,685 issued Jun. 3, 2003 to Zbigniew G. Lassota and entitled "Oxygenating Tea Maker and Method" and U.S. patent application Ser. No. 12/891,328, of Zbigniew G. Lassota filed Sep. 28, 2010, for "Combination Coffee and Tea Brewer and Method of Brewing", both of which are hereby incorporated herein by reference.

It is also known in freshly brewed ice tea makers to provide two or more separate, side-by-side, dispenser loading stations at which two different dispensers, or other beverage containers, may be respectively located for successive receipt of hot, freshly brewed tea extract and diluent water during successive cycles. In such case, the brew basket in which the dry tea ingredient is held during brewing has a drainage spout in the bottom of the brew basket that is offset from the center and located adjacent a peripheral edge of the bottom of the brew basket. The brew basket is rotatable to selectively move the drainage spout between two different lateral positions associated with the two different loading positions. When the brew basket is turned to the left side with the drainage spout on the left side, the dispenser at the left loading position receives the freshly brewed tea extract into the top of the container from the brew basket and receives the diluent water directly from a source of unheated water through a spigot extending outwardly from the brewer housing and received though a mating inlet in the side of the dispenser at the left position. After the dispenser on the left side has been filled, then the brew basket is reloaded with fresh ingredient and may be rotated to the right position to pass hot beverage extract into the top of a dispenser at the right dispenser loading position.

While such dual position brewers add a degree of flexibility without the need for two separate brew baskets, they require the user to manually input different brew cycle parameters sometimes associated with the different sides after the brew basket and dispenser have been properly positioned on one side or the other. Multiple choices may be available for one side or the other that are inappropriate, but nothing is provided to prevent selection by the operator of a brew cycle profile or other parameter for one side of the brewer that is unsuitable for that side and is only suitable for the other side.

SUMMARY OF THE INVENTION

It is therefore an object of the present invention to provide an electrical drip-type beverage brewer having two different dispenser loading stations and a rotatably mounted brew basket that overcome the disadvantages of known brewers of this type.

This object is achieved in part by providing a beverage brewer assembly having a housing, a brewed beverage container, and a source of hot water for mixing with a beverage ingredient, with a brewer control system, having a brew basket for holding beverage ingredient while being mixed with hot brew water, said brew basket having an open top, a generally central axis, and a bottom with an offset drain hole that is radially, outwardly spaced from the generally central axis for passing the hot beverage concentrate to the container; means for mounting the brew basket to the housing in at least two different angular positions in which the drain hole is respectively located in at least two different radial positions outwardly spaced from the generally central axis to pass freshly brewed beverage to the beverage container when in two different positions, respectively; means for sensing in which one of the at least two different angular positions is the brew basket; and means responsive to the brew basket position sensing to automatically enable only at least one preselected function associated with the one position sensed.

Preferably, the brew basket is mountable in three different angular positions including a central position, a left position on one side of the central position and a right position on another side of the central position opposite the left position. A container of one size is associated with both the left position and the right position, and a relatively larger container substantially larger than the one size is associated with the central position. A source of diluent water for mixing with the brewed beverage within the beverage container is provided that may be passed to a beverage container at any of the three locations.

Advantageously, a controller is responsive to the brew basket position sensing means for automatically selecting the total quantity of diluent that is to be passed to the container, a quantity larger than a quantity selectable for the left position and the right position being selected for the central position. The quantity automatically selected for the central position is generally twice the quantity selected for the left position and the right position.

In the preferred embodiment, a touch screen mounted to the housing is provided upon which a plurality of selectable functions that may be enabled and associated with each of the brew basket positions are displayable for touch selection. Advantageously, the brew basket position sensing means includes means for controlling the touch screen to display only the functions associated with the one position sensed that are enabled. Thus, it is not possible for an operator to inadvertently select a brewing function that is inappropriate for the particular location of the brew position of the brew basket.

The preselected functions include at least one of the functions of brew water temperature, quantity of brew water to be dispensed, quantity of bypass water to be dispensed, if any, dispense time period, drip time period, seeping time period, if any, pulse brew operation and a dispense rate profile.

The sensing means includes at least one detectable element carried by the brew basket, and means carried by the housing for sensing the position of the detectable element relative to the at least two different angular positions. Preferably, the detectable element is a magnetically detectable element, and the brew basket position sensing means includes a magnetic switch at each of the at least two different angular positions that are actuated only when the detectable element is located adjacent to the magnetic switch. The magnetic switches are preferably magnetic reed switches, and, preferably, the magnetic detectable element is a powerful niobium rare earth magnet that is securely and protectively mounted to a molded plastic handle attached to the brew basket.

In the preferred embodiment, means are also provided for sensing when the beverage container is located at a fill position beneath the brew basket drain hole as well as means responsive to the beverage container sensing means to disable the diluent water passing means from passing diluent water to the spout associated with fill position unless the beverage container is sensed at the associated fill position.

The object of the invention is also obtained by providing a brew basket with an open top; a bottom with a central portion; a continuous wall extending between and surrounding the open top and bottom with a peripheral edge, a drain hole in the bottom located relatively adjacent the peripheral edge and spaced from the central portion to move in an arc, when the brew basket is rotated about an axis through the central portion, and a detectable element to enable detection of a radial position of the drain hole.

An outwardly extending mounting collar adjacent the open top has at least a portion with a round configuration to enable rotary movement of the brew basket relative to a pair of mating, parallel, spaced mounting rails attached to an underside of a forward part of an upper section of the brewer housing. The detectable element is carried by the brew basket adjacent the top of the brew basket and, when the brew basket is mounted to the mounting rails, adjacent to the underside of the upper housing section. The detectable element is a remotely detectable element, preferably a magnetically detectable element, such as a niobium rare earth magnet. Preferably, the brew basket body is metal and has a molded plastic handle extending outwardly from one side of the continuous wall, and the detectable element is protectively encased within a part of the handle adjacent the open top.

The objective of the invention is also acquired in part by providing for use in a beverage brewer assembly having a housing, a brewed beverage container and a source of hot water for mixing with a beverage ingredient, a beverage brewing method, having the brewing method steps of releasably mounting a brew basket to the housing, said brew basket holding beverage ingredient while being mixed with hot brew water and having an open top, a generally central axis, and a bottom with an offset drain hole that is radially, outwardly spaced from the generally central axis for passing the hot beverage concentrate to the container; moving the brew basket to one or the other of at least two different, preselected angular positions in which the drain hole is respectively located in at least two different radial positions outwardly spaced from the generally central axis to pass freshly brewed beverage to the beverage container when in the two different positions, respectively; automatically sensing in which of the one position and the other position is the brew basket; and automatically responding to the brew basket being in one position to automatically enable at least one preselected brewer function associated with the one position and not associated with the other position.

In a three position brewer, the brewing method preferably includes the steps of moving the brew basket to a third position between the one position and the other position, and automatically enabling a third brewer function associated with third position but not associated with either of the one position and the other position. In such case, the method includes the steps of locating a container of one size at one location on one side of the brewer when the brew basket is in the one position, locating a container of the one size at another location on another side of the brewer opposite the one side when the brew basket is located at the other position, locating a container substantially larger than the one size at a central location between the one location and the other location when the brew basket is in the third position, and the step of automatically responding includes the step of automatically passing diluent water to one location, the other location and the central location respectively depending upon whether the brew basket is in the one position, the other position or the third position.

If the brewer, such as an iced tea brewer, has a source of diluent water for mixing with the brewed beverage within the beverage container, then the method includes the step of responding to the brew basket position for automatically selecting the total quantity of diluent that is to be passed to the container. The quantity automatically selected when the brew basket is in the central position is twice the quantity selected for the one position and the other position.

If a touch screen is provided, the method includes the steps of displaying for touch selection on a touch screen mounted to the housing upon which a plurality of selectable functions may be enabled and associated with each of the brew basket positions, and the touch screen is controlled to display only the enabled functions associated with the sensed position of the brew basket.

In the preferred embodiment, the step of sensing preferably includes the step of magnetically detecting at least one detectable element carried by the brew basket assembly with magnetic reed switches mounted to the housing portion adjacent to the brew basket when mounted to the brewer housing.

Preferably, the step of automatically enabling includes the step of sensing the presence of the beverage container at a loading position and enabling passage of diluent water to the beverage container through one of at least two different diluent water spouts received within the beverage container only when the beverage container is sensed to be in a fill position beneath the brew basket drain hole.

BRIEF DESCRIPTION OF THE DRAWINGS

The foregoing objects, features and advantages of the invention will be described in greater detail and other advantageous features will be made apparent from the following detailed description which is given with reference to the several figures of the drawing, in which:

FIG. 1 is a perspective view of the preferred embodiment of the beverage brewer of the present invention in which two beverage containers are located in the left loading position and right loading position, and the brew basket is in the left position to dispense hot beverage to the beverage container on the left;

FIG. 2A is a perspective view of one form of the detectable brew basket of the present invention with a generally rounded square top with a rounded mounting collar on the opposite sides;

FIG. 2B is a perspective view of another form of the detectable brew basket with a circular collar surrounding the entire brew basket body;

FIG. 3 is an enlarged perspective view of the brew basket handle and the underside of an upper housing section illustrating the positional relationship between the three magnetic read switches and the magnetically detectable element of the handle.

FIG. 4 is a perspective view of the mixing water spouts and the beverage container location sensors mounted to the outwardly facing wall of the lower section of the brewer housing;

FIG. 6 is a logic flow chart of the automatic operation of the beverage brewer assembly of FIGS. 1-5.

DETAILED DESCRIPTION

Figure 5:
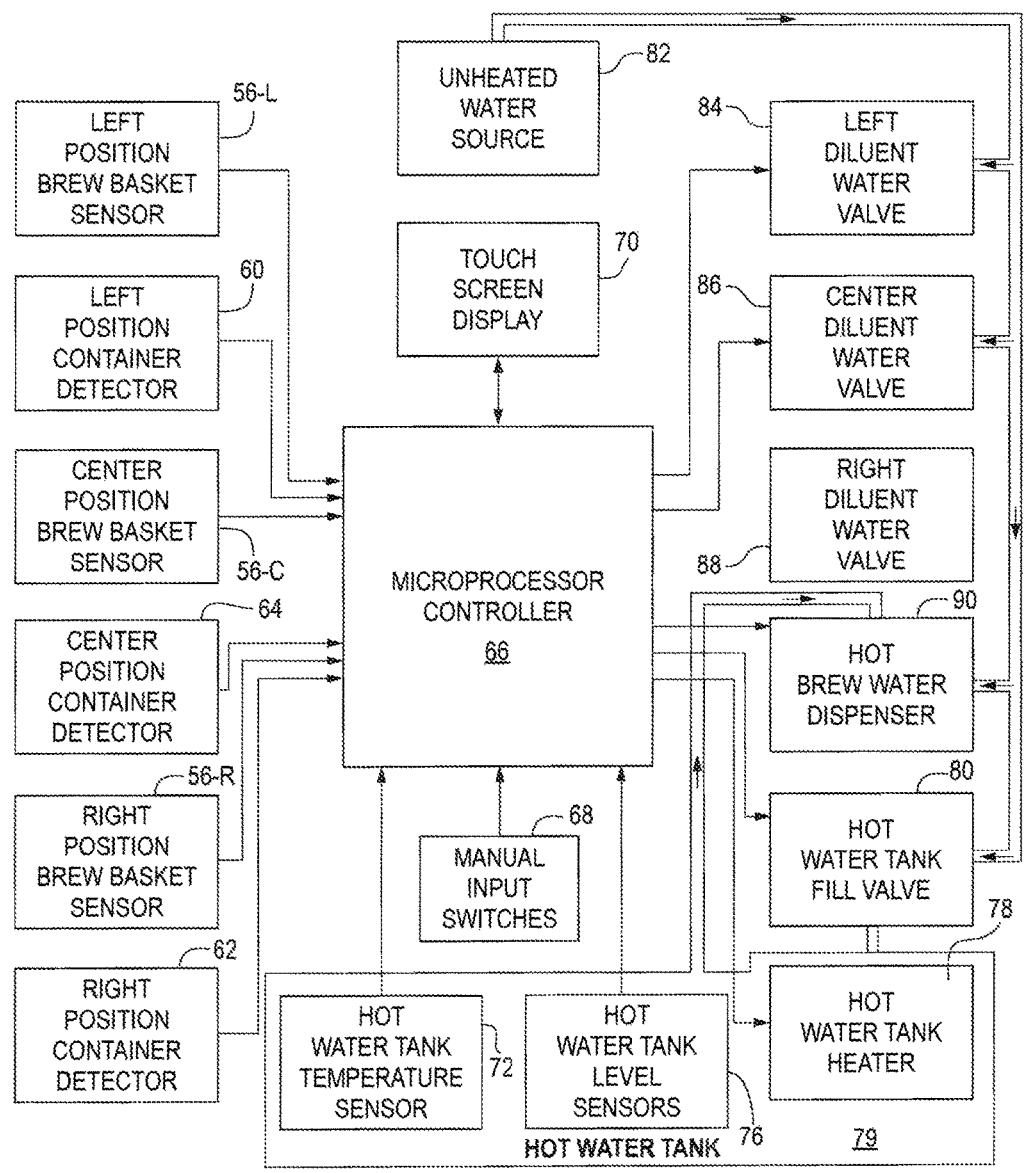
FIG. 5 is a functional block diagram of the preferred embodiment of the beverage brewer assembly of the present invention.

Referring to FIGS. 1, 2A, 2B, 3 and 4, the beverage brewer assembly 10 of the present invention, is seen to have a housing 12 with a rearwardly located, lower, housing section 14 resting on a base with a forwardly extending dispenser docking platform 16. An upper housing section 18 is cantilever supported on the top of the lower housing section 14. A rearward part of the upper housing section 18 is supported directly on the top of the lower housing section 14, and a forward part 20 of the upper housing section 18 extends forwardly from the rearward part and overhangs the dispenser docking platform 16.

A position-detectable, brew basket, or detectable brew basket, 22 of the present invention is slidably, removably mounted to the underside of the forward part 20 of the upper housing section 18. As seen in FIG. 2A, in one form of the detectable brew basket 22 has an outwardly extending rounded, mounting flange 24 on opposite sides of a brew basket body 23 adjacent an open top 25. These rounded mounting flanges are respectively supported on top of a pair of spaced, parallel, horizontal mounting rails 26 on opposite sides of the underside of the forward part 20 of the upper housing section 18. As seen in FIG. 2B, in another form 23 of the detectable brew basket, the mounting flange is defined by a circular collar 24 that entirely surrounds the entire open top 25.

Because the mounting flange 24 is rounded, the brew basket may be rotated between a left side position 28, as shown in FIG. 1, and a right side position 30, as illustrated in FIG. 3. The detectable brew basket 22 may also be positioned at an intermediate position 32 used when a beverage dispenser larger than the dispensers 34 and 36 is located at a central position on the docking platform 16.

As best seen in FIG. 2, but also shown in FIG. 1, the detectable brew basket 22 has a central portion surrounding a symmetrical central axis 38 and a downwardly extending drainage spout 40. The drainage spout 40 is spaced from the central portion and central axis 38 and is located at a peripheral edge of the bottom 42 of the brew basket 22. The drainage spout 40 is tubular with an inlet opening 41 at the interior of the brew basket bottom 42 that is in fluid communication with a downwardly facing spout outlet 44.

Because the drainage spout 40 is at the peripheral edge of the bottom 42, when the detectable brew basket 22 is rotated about central axis 38, the drainage spout 40 swings from side to side between the different positions 28, 30 and 32. A position detectable handle 46 is located in direct alignment with the drain spout 40 to provide a strong visual indication of the relatively aligned position of the drainage spout 40.

More importantly, in accordance with the present invention, the position of the brew basket assembly 22 is detectable by virtue of the detectable handle 46 being attached to the cup shaped outer housing of the brew basket assembly 22. The detectable handle 46 is preferably made from molded plastic, such as polypropylene, to provide thermal insulation from the metal body 48 which becomes hot to the touch during the brewing process. The molded plastic handle 46 also provides an insulated and water proof protective chamber 50 for snugly and permanently holding a magnetically detectable element 52, preferably a strong niobium rare earth magnet. Alternatively, the detectable element may be any other type of magnet, such as a ferromagnet, that has a sufficiently strong magnetic field to be easily detected. The protective chamber 50, unlike the metal brew basket body 48 or a metal handle, permits penetration of magnetic fields produced by the magnetic element 52 for remote detection, while still protecting the magnet from the ambient environment of a coffee brewer including hot water, coffee or tea oils, excessive heat and fines. The detectable element 52 is imbedded in the molded part at the top of the handle 46 corresponding to the protective chamber 50 during the molding process that forms the plastic handle 46. The detectable magnetic element 52 is thereby kept in a fixed and unmovable position relative centrally aligned with the remainder of the handle 46.

The handle 46 is fixedly mounted to the metal, cup-shaped outer housing body 23 of the brew basket 22 with its central symmetrical axis directly aligned with the drainage spout 40. Thus, both the handle 46 and the detectable magnetic element 52 are permanently aligned with the drainage spout 40. The detectable element 52 is located beneath the top surface 54 of the handle 46, and the handle 46 is attached to the brew basket body 48 adjacent the open top 25. Accordingly, when the brew basket assembly 22 is attached to the underside of the forward part 20 of the upper housing section 18, the detectable element 52 is also located adjacent the underside of the forward part 20 of the upper housing section.

Referring to FIG. 3, three identical magnetic reed switches 56 (only one shown), such as model PRX+8218 made by HSI Sensing, 3100 South Norge Road, Chickasha, Okla. 73018, (www.hsisensing.com) are mounted to the underside of the front part 20 of the upper housing section 18 at the three different positions 28, 30 and 32, respectively. In such case, preferably the range of the field strength of the magnetic element 52 is no less than approximately one-half to one inch to insure appropriate actuation of the reed switch 56 when the position of the reed switch 56 and the magnetic element 52 are aligned. On the other hand, the field strength is less than a field strength that would actuate any one of the reed switches 56 other than the one reed switch 56 aligned with the detectable element 52 and not either of the other two reed switches 56 at the positions not aligned with the detectable element 52. When the handle 46 and, thus, the brew basket assembly 22, is moved to one of the three positions 28, 30 and 32, the magnetic reed switch 56 at that position and only at that position is actuated by the magnetic field generated by the magnetically detectable element 52 to switch between one of an on state and an off state, to indicate that the brew basket assembly 22 is at that aligned position. When the brew basket assembly 22 and the magnetic element 52 are moved out of alignment with an actuated reed switch 56, the reed switch 56 at that position automatically reverts another one of the on and off states to indicate that the handle assembly 22 is no longer aligned with that position.

Referring to FIG. 4, a forwardly facing front 58 of the rearward lower housing section 14 carries three different, forwardly extending, mixing water outlet spigots 37, 38 and 39. These mixing water outlet spigots 37 and 39 are automatically received within mating, diluent mixing water inlets (not shown) in the back sides of the beverage dispensers 34 and 36, respectively, when the dispensers 34 and 36 are moved into a corresponding dispenser loading position aligned with the outlet spigots 37 and 39. A third mixing water outlet spigot 38 is received within a double-sized dispenser (not shown) shaped like dispensers 34 but having twice the fluid containing capacity of each.

The forward facing front 58 also carries three outwardly facing dispenser position sensors 60, 62 and 64, preferably photo-detectors, which correspond to the three brew basket positions 28, 30 and 32, respectively. Mechanical switches may be used in lieu of the photo-detectors for the dispenser position sensors 60, 62 and 64. When a regular sized dispenser 34 or 36 is in the left loading position or the right loading position, the associated position sensors 60 and 62 detects its presence, and when a double-sized dispenser (not shown) is mounted on the loading platform 16 in a central location, in lieu of the two regular sized dispensers 34 and 36, the presence of the double-sized dispenser is detected by the middle dispenser sensor 64.

Referring now to FIG. 5, the automatic operation of the brewer assembly is achieved though the use of a microprocessor based controller 66 that operates in accordance with suitable software implementing the logic flow chart of FIG. 6. The controller 66 receives inputs from the left position brew basket sensor 56 at the left position 28, or sensor 56-L; from the right position brew basket sensor 56 at the right position 30, or sensor 56-R, and from the center brew basket position sensor 56 at the center position 32, or sensor 56-C. Inputs are also received from the left, center and right dispenser detectors 60, 64 and 62, respectively. Manual inputs are also received from one or more manual input switches 68, such as the "start brew" switch 21, FIG. 1, that initiates a new brew cycle once the appropriate brewing functions have been selected, and an emergency stop switch.

Manual inputs are also provided by touching virtual switches on a touch screen display 70 at the front, forward looking face of the upper housing section 18. The brewer functions associated with the detected position of the brew basket assembly 22 are displayed on the touch screen display 70 for touch selection. Only the preselected functions associated with detected positions 28, 30 or 32 of the brew basket assembly are displayed for selection. These preselected brewing functions are pre-stored in a parameters memory (not shown) of the microprocessor controller 66, and may be selectively changed. It may be possible to have some or all of the selectable functions associated with the left position 28 and the right position 30 to be the same. For instance, the quantity of mixing water for both the left side 28 and the right side 30 may be the same. If temperature is selectable, then the selectable temperatures may be the same for all three positions.

The controller also routinely relies on inputs from a hot water tank temperature sensor 72 located within a hot water tank 74 and hot water tank level sensors 76 to respectively control a hot water tank heater 78 to maintain a preselected temperature and control a hot water tank fill valve 80 connected to an unheated water source 82 to maintain a preselected level of hot water in the tank 74. The controller responds to the brew basket position sensors 56-L, 56-C and 56-R and the container detectors 60, 64 and 62 and the manual inputs to automatically control actuation of a left diluent water valve 84, a center diluent water valve 86 and a right diluent water valve 88 that are respectively connected to inlets to the diluent water outlet spigots 37, 38 and 39, and a hot water brew water dispenser 90.

The controller 66 operates the brewing assembly 10 in accordance with software illustrated by the logic flow chart of FIG. 6. After start 92 of the program, a determination is made in step 94 whether a brew cycle is currently in process. If so, then the touch screen display 70, displays an appropriate message that a brew cycle is in process in step 96. Since only one brew cycle can be performed at one time, regardless of which dispenser location, nothing can be done until the current brew cycle is completed.

Once the brew cycle is complete, the program moves to step 98, where a determination is made in response to the left position brew basket sensor 56-L if the brew basket is in the left position. If not, then in step 100, a determination is made in response to the right position brew basket sensor 56-R, if the brew basket is in the right position. If not, then a determination is made in response to the center position brew basket sensor 56-C, if the brew basket is in the center position. If not, then the program returns to start 92, and the brew basket position determination sub-routine is repeated.

It is, of course, possible that the brew basket 22 is not even mounted to the brewer upper housing section 18, at all, or that it is mounted, but located between the three detectable positions 28, 30 and 32. In such case, a brew cycle cannot commence or continue. The brew basket 22 must be in one of the three preselected positions in order for a brew cycle to commence. If a "yes" determination is made in steps 98, 100 or 102, then in steps 104, 106 and 108, respectively, determinations are made as to whether a dispenser 34, 36 or an extra large dispenser is located in the left position such as the location of dispenser 34, FIG. 1, the right position, such as the location of dispenser 36, FIG. 1, or the center location for a double-sized dispenser (not shown) respectively corresponding to the left position 28, the right position 30 or the central position 32, of the brew basket 22. If a negative determination is made in steps 104, 106 and 108, then an appropriate message advising the operator to install a dispenser at the appropriate left, right or center locations, respectively, is provided in steps 110, 112 and 114, respectively.

If a positive determination is made in steps 104, 106 and 108, then in step 116 the display 70 presents an image of preselected brewing functions that are appropriate for the particular brew basket position and corresponding dispenser location that have been preselected and stored in the computer during setup or before. The different functions may be associated with different types of beverage ingredient that are displayed with which are associated different brew cycle profiles. Such brew cycle profiles may include one or more brewing parameters, such as a hot brew water dispense rate and duration profile; whether the brew water dispense rate profile employs pulse-brew or continuous dispense operation; whether by-pass water is to be provided and, if so, how much and when; the duration of the drip period following the dispense period; whether there should be a preliminary wetting period and, if so, for how long and at what dispense rate; whether there should be a seeping period and, if so, for how long; the temperature of the dispense water, if the dispense water can be altered on-demand; the amount of unheated, diluent water to be injected into dispenser through one of the diluent water outlet spigots 37, 39 and 38, and when; and any other brew cycle parameters of which the brewer is capable of selectively providing and which have been stored for selection in the parameter memory of the controller 66.

Once the displayed selections or functions have been chosen, then in step 118, the program moves to step 120 to display a message to press the start brew button to begin a new brew cycle. Once the start brew switch 71 of the manual input switches 68 is actuated, as determined in step 122, the program moves to step 124 at which the brew cycle with the brew cycle parameters that have been selected, as determined in step 118, are performed. Once it is determined that the brew cycle has been completed in step 126, then in step 128, an indication is given that the brew cycle is completed so that a new one may begins.

It should be appreciated that many variations of the preferred embodiment may be employed without departing from the spirit and scope of the invention. For instance, while the preferred embodiment is implemented in an ice tea brewer with a capacity to introduce unheated diluent mixing water to the dispenser as part of the beverage making process, the concept of using multiple brewing locations with a single position-detectable brew basket and the automatic selection of brewing functions can also be used with a simple hot beverage brewer to automatically select different brewing parameters. For instance, in such a brewer, when the brew basket is in the left position, the selectable brewing options may include brewing profiles for different types of varieties of coffee. On the other hand, the selectable brewing functions available when the brew basket is in the right side position may include brewing profiles for only different types and varieties of tea and may include a seeping period as part of the brew cycle.

Also, while the magnetic detectable element was secured to a plastic molded handle attached to metallic brew basket, in the case of a brew basket with a plastic molded body, the magnetically detectable element could be mounted to the body of the brew basket. Similarly, while a magnetic detectable element is employed in the preferred embodiment, other types of well-known remote position sensors could be employed, including simple mechanical switches that are engaged by an actuator member when in the detectable position or photosensors that detect a visible mark on the top edge or side of the brew basket. While a touch screen has been shown for purposes of displaying functional options associated with the different brew basket positions, a regular screen with associated virtual push button switches or light or other types of display could also be employed.

The invention claimed is:

1. In a beverage brewer assembly having a housing, a brewed beverage container, a source of hot water for mixing with a beverage ingredient, the improvement being a brewer control system, comprising:

a brew basket for holding beverage ingredient while being mixed with hot brew water, said brew basket having
  an open top,
  a generally central axis, and
  a bottom with an offset drain hole that is radially, outwardly spaced from the generally central axis for passing the hot beverage concentrate to the container;
means for mounting the brew basket to the housing in at least two different angular positions in which the drain hole is respectively located in at least two different radial positions outwardly spaced from the generally central axis to pass freshly brewed beverage to the beverage container when in two different positions, respectively;
means for sensing in which one of the at least two different angular positions is the brew basket; and
means responsive to the brew basket position sensing to automatically enable at least one preselected function associated with the one position sensed.

2. The beverage brewer assembly of claim 1 in which the brew basket may be mounted in three different angular positions including a central position, a left position on one side of the central position and a right position on another side of the central position opposite the left position.

3. The beverage brewer assembly of claim 2 in which
a container of one size is associated with the left position and the right position, and
a container substantially larger than the one size is associated with the central position.

4. The beverage brewing assembly of claim 1 in which the sensing means includes
at least one detectable element carried by the brew basket, and
means carried by the housing for sensing the position of the detectable element relative to the at least two different angular positions.

5. The beverage brewing assembly of claim 4 in which
the at least one detectable element is a magnetically detectable element, and
the brew basket position sensing means includes a magnetic switch at each of the at least two different angular positions that are actuated only when the detectable element is located adjacent to the magnetic switch.

6. The beverage brewing assembly of claim 5 in which each of the magnetic switches is a magnetic reed switch.

7. The beverage brewing assembly of claim 5 in which the magnetically detectable element is a ferromagnet.

8. The beverage brewing assembly of claim 5 in which
the brew basket has a handle mounted to a front side of the brew basket, and
the magnetic element is carried by the brew basket at a location opposite the handle on a back side of the brew basket.

* * * * *